United States Patent [19]

Pearce

[11] 4,215,651
[45] Aug. 5, 1980

[54] INCUBATOR SUITABLE FOR USE IN HATCHING EGGS

[76] Inventor: Francis H. Pearce, West Brinsea Farm, Congresbury, Avon, England

[21] Appl. No.: 957,854

[22] Filed: Nov. 6, 1978

[30] Foreign Application Priority Data

Nov. 16, 1977 [GB] United Kingdom ............. 47741/77

[51] Int. Cl.$^2$ .............................................. A01K 41/06
[52] U.S. Cl. ........................................ 119/36; 119/39; 119/44
[58] Field of Search .................. 119/36, 37, 44, 39

[56] References Cited

U.S. PATENT DOCUMENTS

| 816,003 | 3/1906 | Chambers | 119/36 |
|---|---|---|---|
| 2,287,906 | 6/1942 | Root | 119/36 |
| 2,939,423 | 6/1960 | Luce | 119/37 |
| 3,543,726 | 12/1970 | Marsh | 119/37 |
| 3,783,832 | 1/1974 | Marsh | 119/44 |

Primary Examiner—Hugh R. Chamblee
Attorney, Agent, or Firm—Larson, Taylor and Hinds

[57] ABSTRACT

An incubator is disclosed in which there is a support for supporting eggs, with a flexible screen intended to be positioned over the eggs when supported by the support. There is also provision for hot air to be passed over the screen so that heat is conducted downwardly through the screen to upper portions of the eggs. In addition, or as an alternative, there can be transverse dividers for dividing the eggs into rows on the support, with provision for relative movement on an intermittent basis between the support and the dividers so as to cause rotation of the eggs.

5 Claims, 5 Drawing Figures

INCUBATOR SUITABLE FOR USE IN HATCHING EGGS

BACKGROUND OF THE INVENTION

Incubators for hatching eggs are known in which there is provided a heating means such as an electric element, for example that in a light bulb, and in which the air heated by the heating means passes upwardly around the eggs so as to warm eggs. This, however, is somewhat unnatural because in a nest the bird sits on the eggs and in nature heat is transmitted downwardly through the bird's plumage by conduction to the eggs.

It is also known to rotate eggs periodically, as it is considered desirable to prevent the developing embryo from sticking to the membrane within the egg. One known method for turning the eggs is to put a cross on one side of the egg and a circle on the other side of the egg and for the eggs to be turned by hand periodically. This is particularly laborious. In a known mechanical device for turning eggs, the eggs are put into a rack with their major axes vertical. The eggs are securely clamped in the rack and from time to time, for instance every quarter of an hour or every four hours, the rack is rotated through 90° about a horizontal axis.

Whilst such a device gives tolerable results with the eggs of a reasonably domesticated birds, such as chickens and ducks, this device when used with the eggs of less domesticated birds, such as pheasants and geese, gives results which leave considerable room for improvement.

There is thus a need for an incubator which, by reproducing the effects found in nature, will give satisfactory hatching results.

SUMMARY OF THE INVENTION

The present invention provides an incubator which comprises:
a housing for accommodating eggs to be hatched;
support means within the housing, for supporting eggs;
a flexible screen for placing over eggs on the support means;
heating means for heating air; and
guide means for guiding air, heated by the heating means, above the flexible screen whereby, in use, the screen is heated and heat is conducted downwards through the screen so as to heat upper regions of eggs.

Conveniently the screen is formed of a soft fabric, for example the fabric of a conventional blanket.

The incubator according to the present invention may also include a fan for forcing heated air across the top of the screen. The air may be heated by, for instance, a light bulb. The incubator may also include means for humidifying the air being passed across the top of the screen, so that the air above the eggs has a temperature and humidity corresponding to those of air above eggs in a nest when a bird is sitting. In such a case, the screen may be slightly porous, to permit the passage of air through the screen.

Conveniently the housing comprises a container portion and a cover portion, the screen being dependent from the cover portion such that, with eggs on the support means and with the cover portion on the container portion, the screen rests on the eggs.

Conveniently the support means is a tray, there being dividers above the tray to divide eggs on the tray into rows, there being provision for relative movement between the tray and the dividers, and there being motive means for intermittently causing said relative movement, thereby to cause intermittent rotation of the eggs.

A preferred embodiment is that wherein the tray is reciprocable with respect to the housing and moves freely on roller means, the tray is provided with two downwardly directed lugs, and the said motive means includes a motor with an arm inclined to the shaft of the motor, such that actuation of the motor causes the arm, in one complete circular movement of the arm, to urge one lug and hence the tray in one direction and then to urge the other lug and hence the tray in the opposite directtion.

The incubator may include two parallel rows of notches, whereby dividers can be positioned so that the distance between two adjacent dividers is slightly greater than the diameter of the eggs to be hatched.

The present invention also provides an incubator which comprises:
a housing for accommodating eggs to be hatched;
a tray within the housing, for supporting the eggs;
heating means for heating air;
dividers, for dividing eggs on the tray into rows; and
motive means for intermittently causing relative movement between the tray and the dividers.

Whilst with devices of the known type described above for hatching pheasant eggs a success rate of up to 50% can be achieved, the applicant has found that when hatching pheasant eggs with an incubator in accordance with the present invention which incorporates the screen heated from above and means for rotating the eggs by virtue of the relative movement between the tray and the dividers, a success rate as high as 90% can often be achieved.

Another significant difference between the aforesaid known devices in which the air surrounding the eggs is heated, and the incubator according to the present invention, is that in the known devices the heating of the air surrounding the eggs tends to increase evaporation from the surface of the eggs, which means that high levels of humidity are often required to reduce this effect. In contrast, in the incubator of the present invention the heat is conducted downwardly through the screen to the top of the eggs. Moreover, in the incubator according to the present invention, the eggs lie with their major axes horizontal, which is a more natural position, as found in a nest in nature. In practice, the temperature of the underside of the screen is preferably similar to the surface temperature of a sitting bird, so as to reproduce as effectively as possible the natural environment.

As indicated above, the screen may be porous, to permit some equilisation of the vapour pressure, resulting in the emission of moisture from the underside of the screen, equivalent to the moisture emitted from a bird. However, generally, the porosity of the screen is not sufficient to permit free interchange of air above and below the screen.

The tray on which the eggs are supported may be provided with apertures, to provide some ventilation.

Desirably, the dividers are spaced apart a distance which is slightly greater than the diameter of the eggs to be hatched, so that there is only a slight degree of free play in the system; this means that when there is relative movement between the tray supporting the eggs and the dividers dividing the eggs into rows, there is adequate rotation of the eggs. The dividers may be made from metal or a stiff plastics material and may resemble a rod or strip or may have some other appropriate cross-section.

BRIEF DESCRIPTION OF THE DRAWINGS

For a better understanding of the present invention and to show how the same may be carried into effect, reference will now be made, by way of example, to the accompanying drawings, in which.

DETAILED DESCRIPTION

Figure 1:
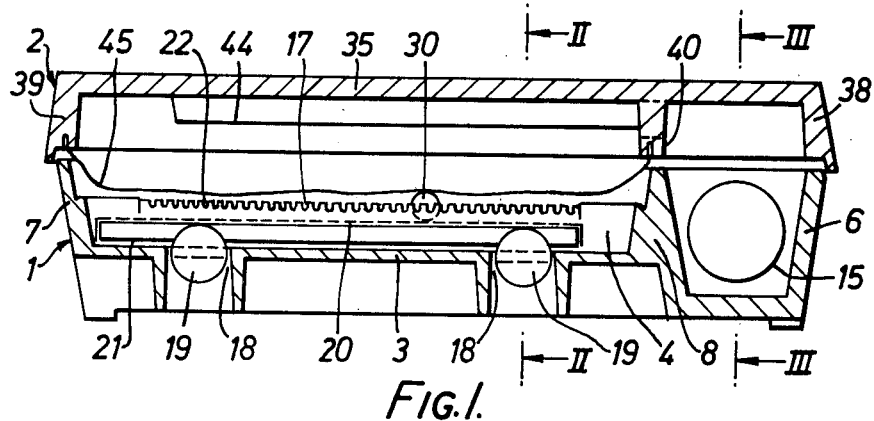
FIG. 1 is a vertical section through one embodiment of an incubator according to the present invention, taken parallel to the major dimension of the incubator.
Figure 2:
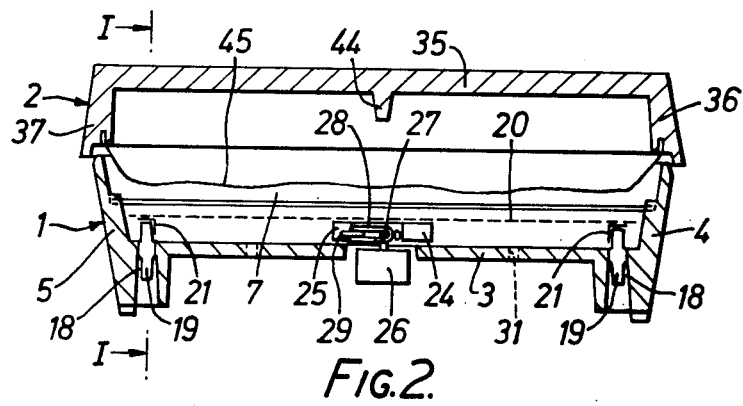
FIG. 2 is a transverse cross-section through the incubator of FIG. 1, taken along the line II—II shown in FIG. 1.
Figure 3:
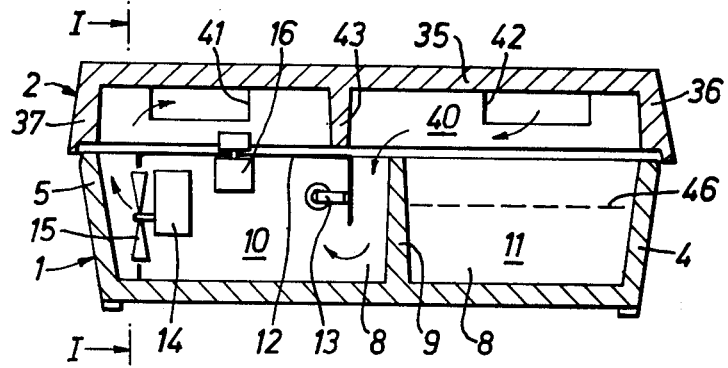
FIG. 3 is a transverse cross-section through the incubator of FIG. 1, taken along the line III—III shown in FIG. 1.

Referring in the first place mainly to FIGS. 1, 2 and 3 of the drawings, the incubator comprises a container portion generally indicated by the reference numeral 1 and a cover portion generally indicated by the reference numeral 2.

As regards the container position 1, a platform 3 extends between two side walls 4 and 5 over a major portion of the length of those walls. Extending between the opposite end regions of the side walls 4 and 5 are two end walls 6 and 7. The platform 3 extends from the end wall 7 to a transverse intermediate wall 8 which is intermediate the end walls 6 and 7 but nearer the end wall 6. Extending between the end wall 6 and the intermediate 8 is a dividing wall 9 (shown most clearly in FIG. 3). Bounded by the side wall 5, end wall 6, dividing wall 9 and intermediate wall 8 is a heating compartment 10; and bounded by the side wall 4, the intermediate wall 8, the dividing wall 9 and the end wall 6 is a humidifying compartment 11. Supported in the heating compartment 10 is a sub-frame 12 which supports an electric heater 13, an electric motor 14 for driving a fan 15, and a control unit 16 for controlling the electric heater 13.

Provided in the inward facing surface of the side walls 4 and 5 are two parallel rows of notches 17, one row being in the side wall 4 and the other in the side wall 5.

Provided in the platform 3 are four slots 18 parallel to the major dimension of the incubator, there being two slots 18 on one side region of the platform 3 and two slots 18 on the opposing side region of the platform 3. Rotatably mounted in the four slots 18 are four wheels 19, and mounted on the wheels 19 is a tray 20, there being two angle pieces 21 attached to the underside of the tray 20 in opposing edge regions such that the upper regions of the wheels 19 bear against the angle pieces 21.

In some of the notches 17 are dividers 22 (shown in FIG. 4) which takes the form of rods extending from one row of notches 17 to the other row of notches 17 and which serve to divide eggs on the tray 20 into rows.

Below, and secured to, the tray 20 is a plate 23 provided with two downwardly directed lugs 24 and 25. Mounted in a central region of the platform 3 is an electric motor 26 having a suitably geared-down drive shaft 27 to which is secured a forked arm 28, the free end regions of the forked arm 28 carrying a freely rotatable wheel 29. The arrangement is such that in use rotation of the shaft 27 of the motor 26 causes rotation of the arm 28 so that the wheel first abuts against the lug 25 thus causing the plate 23 and hence the tray 20 to move in one direction, after which the wheel 29 moves clear of lug 25; the shaft 27 and arm 28 continue to rotate in the same direction and in due course the wheel 29 abuts the lug 24 and for some time causes the lug 24 and hence the plate 23 and tray 20 to move in the opposite direction to that in which the lug 25 was caused to move. This continues until the wheel 29 becomes free of the lug 24, after which the arm 28 continues to rotate until such time as the wheel 29 re-engages the lug 25.

Figure 4:
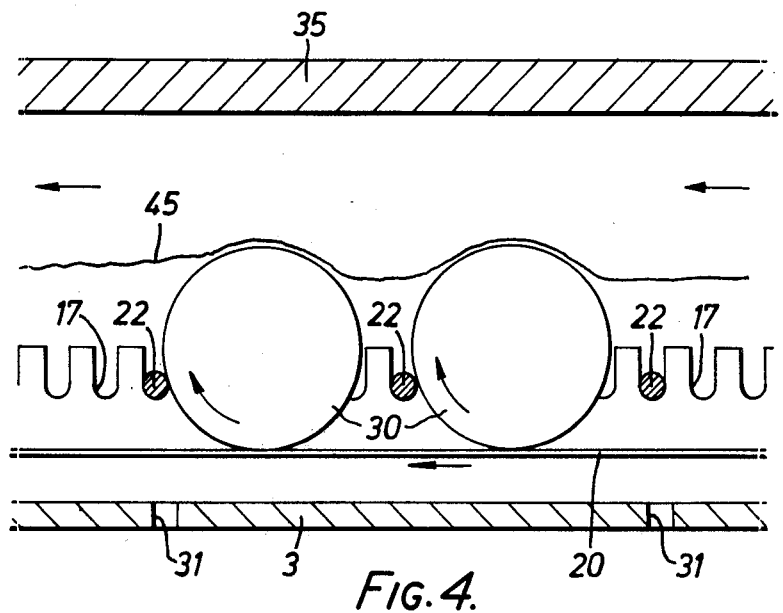
FIG. 4 is a side view, on an enlarged scale, of part of the incubator shown in FIG. 1, with the eggs in position.
Figure 5:
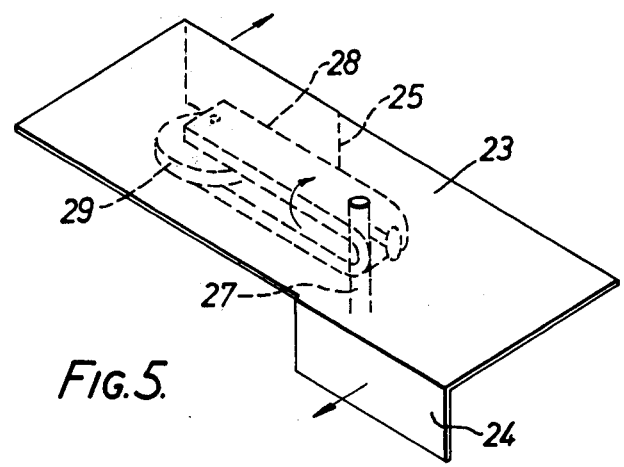
FIG. 5 is an isometric view, on an enlarged scale, showing part of the mechanism for causing reciprocating movement of the tray.

Eggs 30 are shown resting on the tray 20 in FIG. 4 and it will be appreciated that, because of the limited space between the two dividers 22 of an adjacent pair, a reasonable movement of the tray 20 relative to the dividers 22 causes rotation of the eggs 30 about their major axes.

Provided in the platform 3 are apertures 31 for ventilation purposes, and for similar purposes the tray 20 is perforated.

Turning now to the cover portion 2, this includes a flat portion 35 with two dependent side walls 36 and 37, and two dependent end walls 38 and 39. Extending between the side walls 36 and 37 is an intermediate transverse wall 40 provided with two apertures 41 and 42, and extending between the intermediate transverse wall 40 and the end wall 38 is an intermediate longitudinally extending wall 43. Also dependent from the flat portion 35 is a dependent wall 44 which is parallel to the side walls 36 and 37 and extends from the intermediate transverse wall 40 in the direction of the end wall 39 but stops short of the end wall 39.

Secured to the lower end regions of the end wall 39, transverse wall 40 and part of the side walls 36 and 37 is a flexible screen in the form of a sheet 45 of blanket material. Also indicated in FIG. 3 is the level 46 of water in the humidifying compartment 11.

The position of the walls of the cover portion 2 is such that the side walls 36 and 37 cooperate with the side walls 4 and 5, and the end walls 38 and 39 cooperate with the end walls 6 and 7, to form a resonable seal. Additionally, the walls 40 and 8 cooperates to form a seal between, on the one hand, the compartment where the eggs are to be supported and, on the other hand, the heating and humidifying compartments 10 and 11, except for the apertures 41 and 42. The dependent wall 43 is offset with respect to the dividing wall 9 so that, in use, air may pass above the humidifying compartment 11, then over the wall 9, and then down into the heating compartment 10.

In use of the incubator, eggs 30 are carefully laid on the tray 20 with their major axes horizontal and perpendicular to the major dimension of the incubator. The dividers 22 are placed in the appropriate notches 17 so as to allow merely slight movement of the eggs 30. Water is introduced into the humidifying compartment 11 up to the mark 46, the control 16 is actuated to operate by varying the speed of the motor 26. The cover portion 2 is placed over the container portion 1 so that the underside of the sheet 45 contacts the upper regions of the eggs 30. Air is heated in the heating compartment 10 by the lamp 13 and is forced by the fan 15 into a zone above the sub-frame 12; from here it passes through the aperture 41 and then moves across the sheet 45 away from the aperture 41. It then returns towards the aperture 42, on the opposite side of the wall 44, and, after passing through the aperture 42, passes across the body of water in the humidifying compartment 11. The resulting humidified air then passes over the top of the dividing wall 9 and back into a lower region of the heating compartment 10.

The fan 15 is operated at such a speed as to ensure that the warmed air passed across the top of the sheet 45 moves sufficiently rapidly to ensure minimal temperature differences between different regions of the sheet 45. Depending on the size of the eggs 30, the length of the arm 28 and the spacing between the lugs 24 and 25, the eggs 30 can be rotated through up to 180° and then back through approximately the same angle, in every complete cycle. The cycle can take, for example, one hour, although this can be varied according to the farmer's preference, by varying the speed of the motor 26.

The particular mechanism for effecting reciprocation described above, namely the relationship between the arm 28 and wheel 29, on the one hand, and the plate 23 with its lugs 24 and 25, on the other hand, enables the tray 20 to be lifted out of the container portion 1 for cleaning purposes, after the eggs have hatched. Obviously, once the eggs begin to hatch, the reciprocating movement of the tray 20 is stopped, to avoid any injury to the emerging bird.

Depending on ambient conditions, the incubator can be operated without the eggs being present, until the desired temperature and humidity are attained, after which the cover portion 2 can temporarily be removed while the eggs are loaded into the container portion 1.

What is claimed is:

1. An incubator which comprises a housing for accomodating eggs to be hatched; a tray within the housing, for supporting eggs, the tray being reciprocable with respect to the housing and being movable freely on roller means, and the tray being provided with two downwardly directed lugs; dividers above the tray, to divide eggs on the tray into rows; a flexible screen for placing over eggs on the support means; heating means for heating air; guide means for guiding air, heated in use by the heating means, above the flexible screen whereby, in use, the screen is heated and heat is conducted downwards through the screen so as to heat upper regions of eggs; and motive means for intermittently causing relative movement between the tray and the dividers, thereby to cause intermittent rotation of any eggs on the tray, the motive means including a motor with an arm inclined to the shaft of the motor, such that actuation of the motor causes the arm, in one complete circular movement of the arm, to urge one of the two lugs and hence the tray in one direction and then to urge the other of the two lugs and hence the tray in the opposite direction, the arm carrying a roller means for rolling abutment against the lugs.

2. An incubator according to claim 1, wherein the screen is formed of a soft fabric porous to an extent to permit the passage of water vapour through the screen, and wherein the incubator also includes a fan for forcing heated air across the top of the screen, the air being heated by a light bulb, and means for humidifying air being passed across the top of the screen.

3. An incubator according to claim 1, wherein the housing comprises a container portion and a cover portion, the screen being dependent from the cover portion such that, with eggs on the support means and with the cover portion on the container portion, the screen rests on the eggs.

4. An incubator according to claim 1, which includes two parallel rows of notches, whereby dividers can be positioned so that the distance between two adjacent dividers is slightly greater than the diameter of the eggs to be hatched.

5. An incubator which comprises a housing for accommodating eggs to be hatched; a tray within the housing, for supporting the eggs, the tray being reciprocable with respect to the housing and being movable freely on roller means, and the tray being provided with two downwardly directed lugs; heating means for heating air; two parallel rows of notches, and dividers, for dividing eggs on the tray into rows, the dividers being positionable in the notches so that the distance between two adjacent dividers is slightly greater than the diameter of the eggs to be hatched; and motive means for intermittently causing relative movement between the tray and dividers, the motive means including a motor with an arm inclined to the shaft of the motor, such that actuation of the motor causes the arm, in one complete circular movement of the arm, to urge one of the two lugs and hence the tray in one direction and then to urge the other of the two lugs and hence the tray in the opposite direction, the arm carrying a roller means for rolling abutment against the lugs.

* * * * *